(12) United States Patent
Luan

(10) Patent No.: US 8,126,522 B2
(45) Date of Patent: Feb. 28, 2012

(54) ANTENNA DEVICE AND PORTABLE ELECTRONIC DEVICE COMPRISING SUCH AN ANTENNA DEVICE

(76) Inventor: Yuantao Luan, Beijing (CN)

( * ) Notice: Subject to any disclaimer, the term of this patent is extended or adjusted under 35 U.S.C. 154(b) by 59 days.

(21) Appl. No.: 12/675,109

(22) PCT Filed: Jul. 21, 2009

(86) PCT No.: PCT/SE2009/050910
§ 371 (c)(1),
(2), (4) Date: Feb. 24, 2010

(87) PCT Pub. No.: WO2010/011173
PCT Pub. Date: Jan. 28, 2010

(65) Prior Publication Data
US 2011/0130179 A1    Jun. 2, 2011

(30) Foreign Application Priority Data
Jul. 21, 2008 (EP) ...................... 08160811

(51) Int. Cl.
*H04M 1/00* (2006.01)

(52) U.S. Cl. .................. 455/575.7; 455/562.1; 455/82; 455/83; 455/63.3

(58) Field of Classification Search ............... 455/562.1, 455/575.7, 63.3, 82–83; 343/749, 843, 860, 343/700 R
See application file for complete search history.

(56) References Cited

U.S. PATENT DOCUMENTS

| | | | |
|---|---|---|---|
| 4,630,064 A * | 12/1986 | Andrews et al. | 343/895 |
| 6,526,263 B1 | 2/2003 | Saito | |
| 2005/0088341 A1* | 4/2005 | Yang | 343/700 MS |
| 2009/0058755 A1 | 3/2009 | Ozaki et al. | |
| 2009/0079656 A1* | 3/2009 | Peyla et al. | 343/860 |
| 2009/0303140 A1 | 12/2009 | Sato | |
| 2011/0028103 A1* | 2/2011 | Rofougaran | 455/77 |

FOREIGN PATENT DOCUMENTS

| | | |
|---|---|---|
| EP | 1324425 | 7/2003 |
| EP | 1542313 | 6/2005 |
| EP | 1916774 | 4/2008 |
| EP | 2148391 | 1/2010 |
| WO | WO2007/042615 | 4/2007 |
| WO | WO2007/125850 | 11/2007 |
| WO | WO2007/128340 | 11/2007 |
| WO | WO2008/126724 | 10/2008 |

OTHER PUBLICATIONS

International Search Report and Written Opinion for PCT/SE2009/050910, dated Nov. 5, 2009, 9 pages.

(Continued)

*Primary Examiner* — Wayne Cai
(74) *Attorney, Agent, or Firm* — Harness, Dickey & Pierce, P.L.C.

(57) ABSTRACT

An antenna device for a portable electronic device, preferably for the FM frequency range, generally includes a monopole radiating and/or radiation receiving element including a feeding portion adapted to be connected to an antenna connection point. An inductor is connectable between the antenna connection point and ground. The input of an amplifier stage is also connectable to the antenna connection point. An output of the amplifier stage is connectable to a radio circuit, all provided in the interior of the portable electronic device.

20 Claims, 3 Drawing Sheets

OTHER PUBLICATIONS

European Search Report and Opinion for EP08160811.9 dated Dec. 12, 2008,7 pages.

European Office Action from European patent application No. EP08160811.9 (now EP2148391) which is related to the instant application through a priority claim; dated Jul. 30, 2010; one page.

European Search Report from European patent application No. EP08160811.9 (now EP2148391) which is related to the instant application through a priority claim; dated Dec. 10, 2008; 7 pages.

* cited by examiner

US 8,126,522 B2

ANTENNA DEVICE AND PORTABLE ELECTRONIC DEVICE COMPRISING SUCH AN ANTENNA DEVICE

CROSS-REFERENCE TO RELATED APPLICATIONS

This patent application is a U.S. national stage filing under 35 U.S.C. §371 of International Application No. PCT/SE2009/050910 filed Jul. 21, 2009, which claims priority of European patent application EP08160811.9 filed Jul. 21, 2008. The disclosures of the applications identified in this paragraph are incorporated herein by reference in their entirety.

FIELD OF INVENTION

The present invention relates generally to antenna devices and more particularly to an antenna device for use in a portable electronic device, such as a mobile phone, which is adapted for radio signals having a relatively low frequency, such as radio signals in the FM band.

BACKGROUND

Internal antennas have been used for some time in portable radio communication devices. There are a number of advantages connected with using internal antennas, of which can be mentioned that they are small and light, making them suitable for applications wherein size and weight are of importance, such as in mobile phones.

However, the application of internal antennas in a mobile phone puts some constraints on the configuration of the antenna element. In particular, in a portable radio communication device the space for an internal antenna arrangement is limited. These constraints may make it difficult to find a configuration of the antenna that provides for a wide operating band. This is especially true for antennas intended for use with radio signals of relatively low frequencies as the desired physical length of such antennas are large compared to antennas operating with relatively high frequencies.

One specific application operating in a relatively low frequency band is the FM radio application. The FM band is defined as frequencies between 88-108 MHz in Europe and USA or between 76-90 MHz in Japan, i.e. 76-108 MHz worldwide. Prior art conventional antenna configurations, such as loop antennas or monopole antennas, fitted within the casing of a portable radio communication device will result in unsatisfactory operation in that the antenna either has too bad performance over a sufficiently wide frequency band or sufficient performance over a too narrow frequency band.

Instead, a conventional FM antenna for portable radio communication devices is provided in the headset wire connected to the communication device. This configuration with a relatively long wire permits an antenna length that is sufficient also for low frequency applications. However, if no external antenna is permitted this solution is obviously not feasible.

Another problem is that in case a second antenna, such as a GSM antenna, is provided in the same communication device as the FM antenna, this second antenna interferes with the operation of the FM antenna.

SUMMARY OF THE INVENTION

An object of the present invention is to provide an internal antenna device for use in a portable electronic device, which operates with sufficient performance throughout a frequency band having a relatively low frequency, such as the FM radio band.

The invention is based on the realization that an active internal antenna can be configured as a monopole antenna.

According to the present invention there is provided an antenna device for receiving radio signals in at least one operating frequency band and for being provided in the interior of a portable electronic device, said antenna device comprising a monopole radiating and/or radiation receiving element including a feeding portion adapted to be connected to an antenna connection point, where an inductor is connectable between the antenna connection point and ground and the input of an amplifier stage is also connectable to said antenna connection point, where an output of the amplifier stage is connectable to a radio circuit, all to be provided in the interior of the portable electronic device.

A portable electronic device comprising a ground plane, an antenna connection point, an inductor connected between said antenna connection point and ground, an amplifier stage with an input connected to the antenna connection point, a radio circuit connected to an output of the amplifier stage, and such an antenna device is also provided.

The antenna device according to the invention provides operation with sufficient performance throughout a frequency band having a relatively low frequency, such as the FM radio band. By using a monopole antenna, it has been found that the sensitivity is improved across the entire operating frequency range, giving good signal to noise ratio despite having a resonant frequency behavior in terms of gain. There is therefore no need for any frequency tuning. The inductor connected between the monopole element and ground increases source resistance seen by the amplifier stage, thus matching noise and increasing stability.

In a preferred embodiment, the monopole element is a top-loaded monopole element that is co-designed with the inductor and amplifier stage.

Further preferred embodiments are defined in the dependent claims.

BRIEF DESCRIPTION OF DRAWINGS

The invention is now described, by way of example, with reference to the accompanying drawings, in which.

DETAILED DESCRIPTION OF THE INVENTION

In the following, a detailed description of a preferred embodiment of an antenna and portable electronic device according to the invention will be given. In the description, for purposes of explanation and not limitation, specific details are set forth, in order to provide a thorough understanding of the present invention. However, it will be apparent to one skilled in the art that the present invention may be utilized in other embodiments that depart from these specific details. In other instances, detailed descriptions of well-known units, entities and circuits are omitted so as not to obscure the description of the present invention with unnecessary details.

Figure 1:
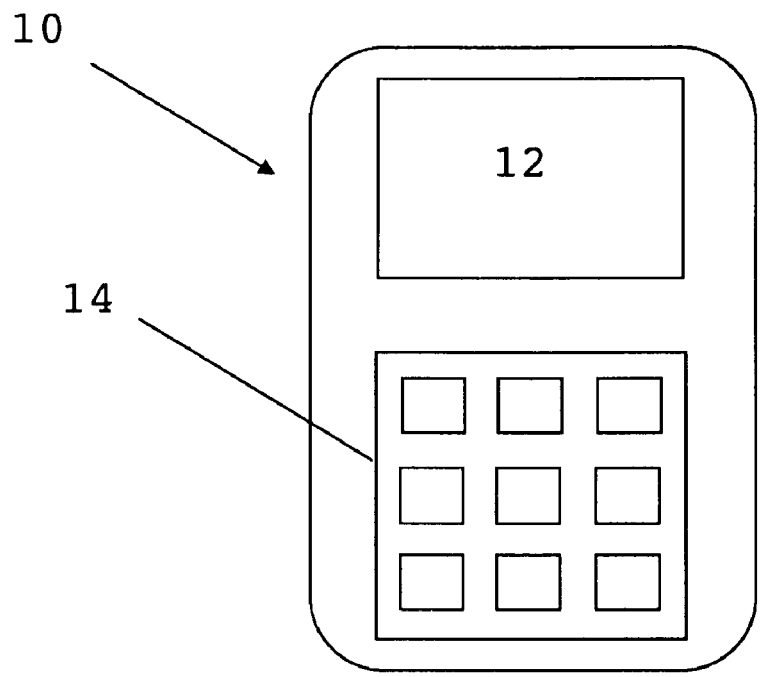
FIG. 1 shows a front view of a portable electronic device according to the present invention.

FIG. 1 shows a front view of a portable electronic device 10, such as a mobile phone. The portable electronic device can however be another type of device, such as a lap top computer, a palm top computer, an electronic organizer such as a personal digital assistant (PDA), a game console, a small clock, such as a travel alarm clock, a TV receiver, an FM radio receiver or a media player such as an MP3 or a CD player. The device 10 is, as an example, provided with a display 12 placed close to an upper end of the device and a keypad 14 placed close to a lower end of the device. The display 12 and keypad 14 are provided on the casing of the device 10. It should however be realized that the device may just as well be provided without a display and/or without a keypad. The device 10 is also provided with at least one antenna. However, all antennas are provided inside the device, i.e. in the interior of the device.

Figure 2:
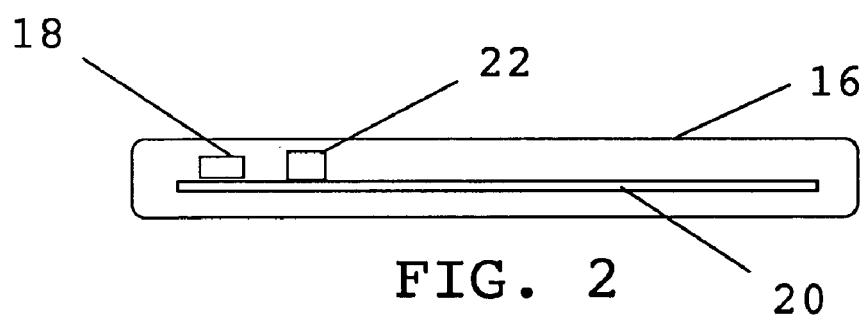
FIG. 2 shows a sectional view of the portable electronic device according to the present invention.

FIG. 2 shows a schematic side view of the device 10, which is a cross section through the casing 16. In order to clarify the description of the present invention only elements that are necessary for understanding the present invention are included. Thus a number of units in the device have here been omitted, like for instance the display and the keypad shown in FIG. 1. The device 10 here includes a circuit board 20 on which an antenna device 18 according to the present invention is mounted. On the board 20 there is furthermore a radio circuit 22, here in the form of an FM receiver circuit, which may for instance be used to demodulate radio signals received by the antenna device. The circuit board 20, which may be a multi-layer PCB (printed circuit board), furthermore includes a ground plane (not shown), which is used together with the antenna device 18 of the present invention.

Figure 3:
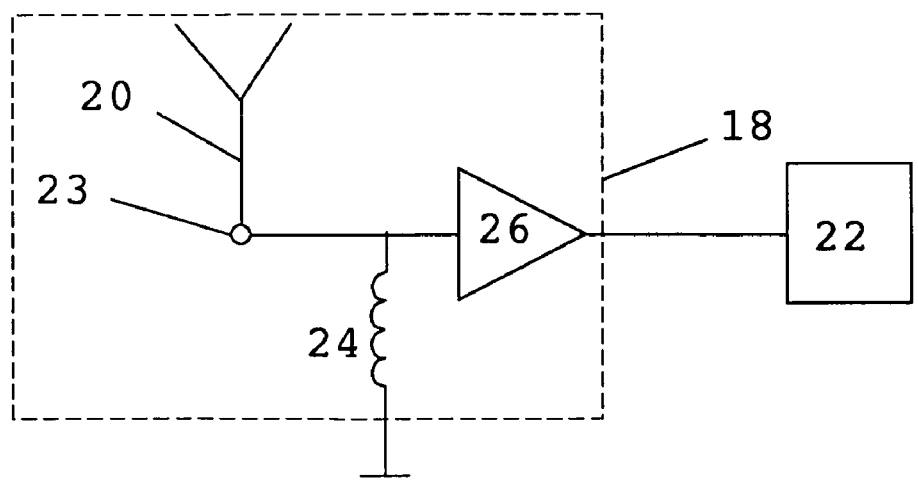
FIG. 3 shows a schematic diagram of an antenna device according to the invention connected to a radio circuit.

With reference to FIG. 3, the general configuration of an antenna device 18 according to a first embodiment of the present invention being connected to the radio circuit 22 is shown. The antenna device 18 here includes a radiating and/or radiation receiving element 20, which may be provided in the form of a non-resonant piece of electrically conductive material. It may be provided in the form of a metal wire or as a conductive trace on a flex film. The element is furthermore a monopole element, the details of which will be described in more detail below.

The monopole element 20 is connected to an antenna connection point 23, which leads to a shunt inductor 24 being connected between the antenna connection point 23 and ground. This shunt inductor may be physically connected relatively close to the antenna connection point. There is furthermore an amplifier stage 26 in the antenna device 18, the input of which is also connected to the antenna connection point 23 and the output of which is connected to the FM receiver circuit 22, which could be a conventional circuit manufactured by Philips Semiconductors and sold under the name HVQFN40. The amplifier stage 26 amplifies signals received by the monopole element 20 and provides them to the FM receiver circuit 22.

Figure 4:
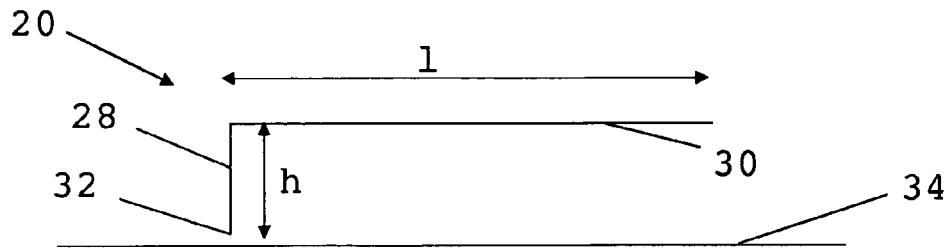
FIG. 4 shows a schematic side view of a monopole element of the antenna device provided above a ground plane.

FIG. 4 schematically shows a side view of the monopole element 20 according to the first embodiment being provided adjacent the ground plane 34 provided in the circuit board. As can be seen the monopole element 20 is a top loaded elongated monopole element. The monopole element 20 here includes a first section 28, which at a first end provides a feeding portion 32 for connection to the antenna connection point and is at a second opposite end joined to a first end of a second section 30. The second end of the second section 30 is in this embodiment free, i.e. it is not connected to any further sections or other elements, but is here provided at a distance h from the ground plane 34. The second section 30 is furthermore at least partly aligned with the ground plane 34 and when the monopole element 20 is placed adjacent said ground plane 34 preferably more than half of the second section 30 is aligned with the ground plane 34. Here the whole of the second section 30 is aligned with the ground plane 34, which means that all of it is placed above the ground plane 34.

The first section 28 has an extension h in a first dimension away from the feeding portion 32, which first dimension is here a dimension that is perpendicular to the ground plane 34. In this embodiment the first section does only have an extension in this dimension. It should however be realized that it may as an alternative also have an extension in a second and/or a third dimension, which second and third dimensions are both perpendicular to the first dimension and to each other. The first section 28 does thus have an extension h in the first dimension. The second section 30 extends in a plane provided in the second and third dimensions. This means that the whole second section 30 is provided in a plane that is parallel with and distanced a distance h from the ground plane 34. The second section 30, which in this embodiment is a straight section, does furthermore have a length l that is the electrical length of the monopole element 20.

Figure 5:
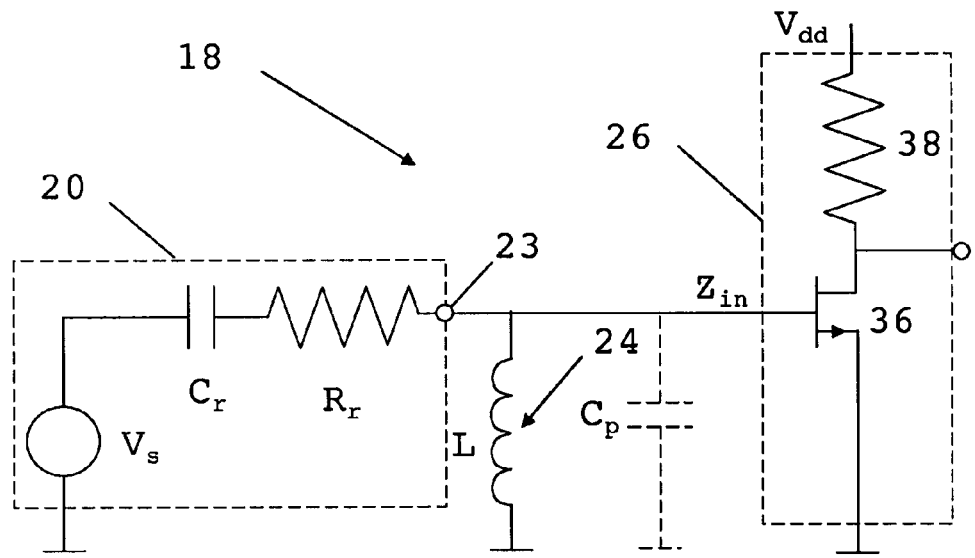
FIG. 5 is a circuit diagram of the antenna device of the present invention, where corresponding electrical circuit elements of the monopole element are included.

FIG. 5 schematically shows a circuit diagram of the antenna device 18 according to the first embodiment of the present invention, where corresponding electrical circuit elements according to a model of the monopole element 20 are included. The monopole element 20 is thus here represented by an electrical circuit including a voltage source $V_s$ connected between ground and a series circuit made up of a radiator capacitance $C_r$ and a radiator resistance $R_r$. The radiator resistance $R_r$ is furthermore connected to the input of the amplifier stage 26 as is the inductor 24. The inductor 24 is here shown as having an inductance L, which may be about 1 µH. There is furthermore here a parasitic capacitance $C_p$ provided between the input of the amplifier stage 26 and ground. The input of the amplifier stage 26 is shown as having an input impedance $Z_{in}$. The amplifier stage 26 here comprises a field effect transistor (FET) 36 with the gate connected to the shunt inductor 24, the source connected directly to ground and the drain connectable to the input of the FM receiver circuit (not shown). There is also a load resistor 38 connected between the drain of the transistor 36 and a feed voltage Vdd. The amplifier stage 26 is here a GaAs amplifier stage, which means that the FET transistor 36 is here a GaAS FET transistor, which may be a GaAs pHEMT transistor. The parasitic capacitance $C_p$ occurs because of the non-ideal properties of wires, connection points and the gate-source connection of the transistor 36 in the amplifier stage 26.

The monopole element 20 and the inductor 24 are here co-designed with the amplifier stage 26. This means that none of them are adapted to the 50Ω impedance normally used when connecting various elements. The reason for this is that it is very hard to adapt the impedance of a small monopole element to this type of impedance. Therefore the amplifier stage 26 is designed to have a high input impedance $Z_{in}$, which is typically ten times or more higher than 50 Ω.

The monopole element 20 and inductor 24 are here thus adapted to match the input impedance $Z_{in}$ of the amplifier stage 26. These are thus selected to provide, perhaps together with the parasitic capacitance $C_p$, an impedance at the antenna connection point 23 that matches the input impedance $Z_{in}$ of the amplifier stage 26.

This is essentially done through selecting dimensions of the monopole element 20 for obtaining an antenna capacitance, which antenna capacitance is here only made up of the radiator capacitance $C_r$, so that the antenna capacitance together with the inductance L of the inductor 24 and the parasitic capacitance $C_p$ match the input impedance $Z_{in}$. This matching may also involve selection of the radiator resistance $R_r$.

With the antenna structure in FIG. 4, the radiator capacitance $$C_r \propto l/h,$$

while the radiator resistance $$R_r \propto h^2,$$

The wavelengths of the frequency band are here ten times or more longer than the electrical length l of the monopole element. This means that the electrical length of the monopole element is here far too short for providing resonance. Through selecting length and height of the monopole element together with a corresponding selected value of the inductor, typically around 1 µH, it is therefore possible to provide matching to the amplifier stage. The inductor increases the source impedance seen by the transistor of the amplifier stage, thus matching noise and increasing stability.

Figure 6:
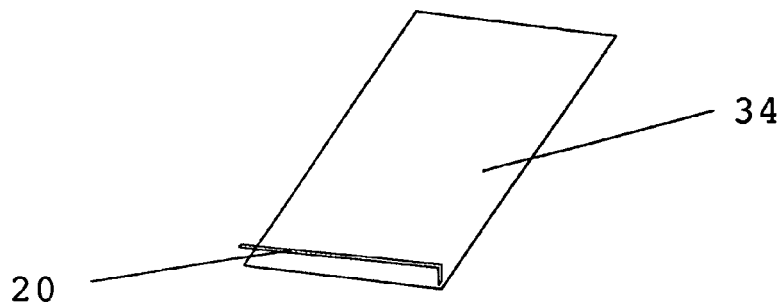
FIG. 6 is a schematic perspective view of a monopole element configuration in relation to a ground plane according to a first embodiment of the present invention.

The ground plane may extend over an area that is limited by a number of corners. It may typically be rectangular in shape and thus have four corners. The antenna connection point may here be provided adjacent one of these corners of the ground plane. With such a placing the first section of the monopole element 20 may therefore be provided at a corner of the ground plane 34, with the second section stretching out across the ground plane, as is shown in FIG. 6. The second section may here stretch along a short side of the ground plane 34 that is provided at the upper or lower end of the portable electronic device. With this type of placing of the monopole element 20, it is possible to let the ground plane 34 of the circuit board enhance the performance of the antenna device.

The antenna device according to the described embodiment receives radio signals that are here FM radio signals. The antenna device is thus provided for operating in a frequency band, which frequency band is here the FM frequency band. In the case of operation in the FM band, the pass band is between 88-108 MHz in Europe and USA or between 76-90 MHz in Japan.

Through the use of a monopole element being matched to an amplifier stage using an inductor there is obtained an antenna that has a good isolation in relation to magnetic interference, especially as compared with magnetic dipole antennas. This is important if the portable electronic device is a cellular phone where there may exist a number of different antennas, such as GSM antennas, Bluetooth antennas and GPS antennas. In this way the induced noise and interference coupled to the monopole element is minimized.

Figure 7:
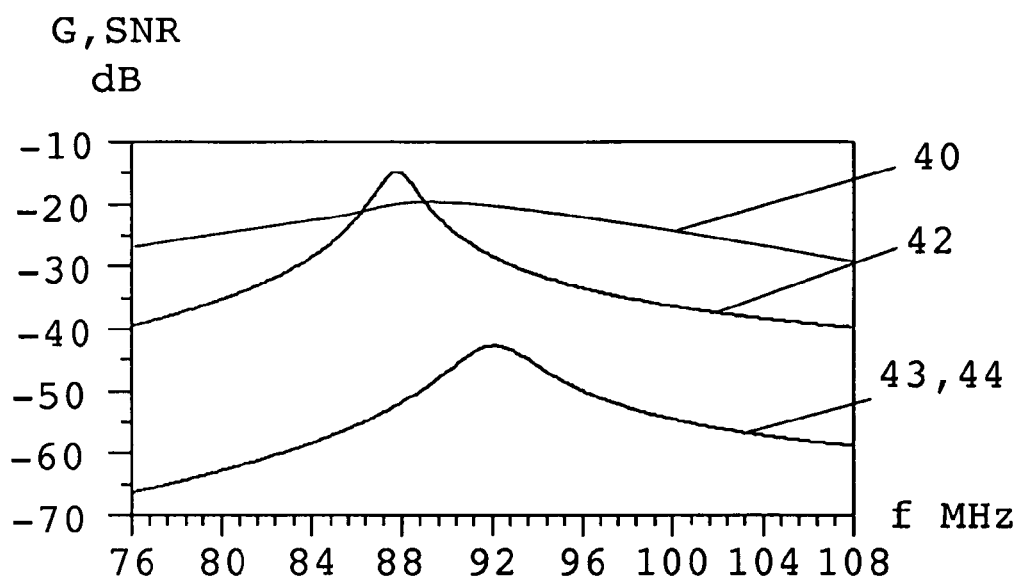
FIG. 7 shows curves of the gain and SNR for an antenna device using a monopole element having the configuration of FIG. 6 compared with a curve of the gain and SNR of an antenna with the same monopole element and using conventional passive conjugate impedance matching.

The antenna device including monopole element, inductor and amplifier stage is here a so-called active antenna. FIG. 7 shows the SNR (Signal to Noise Ratio) 40 at the input of the receiver circuit (in dB) for the antenna device of the described embodiment compared to a lossless reference dipole antenna (at 0 dB), together with the gain 42 of the antenna device of the described embodiment and the gain 43 and SNR 44 at the input of the receiver circuit for a monopole element of the described embodiment using conventional passive conjugate impedance matching (i.e. without amplification). As can be seen in FIG. 7, the SNR 40 at the receiver circuit input with the antenna device according the first embodiment is both significantly higher and has less variation over the whole frequency range as compared with the SNR 44 of the monopole element that uses conventional matching. The antenna device of the described embodiment is therefore suitable for operating in the entire worldwide FM radio frequency range, without any need of frequency tuning using e.g. a varactor, despite having a resonant frequency behavior in terms of gain.

The antenna device furthermore provides ESD protection, effectively blocking the major part of the ESD pulse spectrum. This also eliminates or at least reduces interference from electro magnetic interference (EMI) and possibly signals from other antennas provided in the same radio communication device, such as cellular GSM antennas operating at frequencies well above the FM antenna.

It is preferred that the shunt inductor 24 and amplifier stage 26 are provided relatively close to the monopole element 20 in order to minimize parasitic effects and interference from external sources.

In order for the antenna device to operate, the transistor of the amplifier stage may preferably have a minimum noise figure below 1 dB and a gain above 15 dB in the operating frequency band. Also, it is preferred that the transistor has a noise resistance Rn of less than 10 Ohms in order to achieve highest possible signal reception quality for arbitrary antenna configurations. A further preferred characteristic of the transistor is that the input capacitance is low, preferably less than 3 pF, in order to obtain high input impedance.

Furthermore, the amplifier stage can in a variation of the present invention also be a so-called cascode amplifier stage. Such a cascode amplifier stage comprises a first field effect transistor with the gate connected to the monopole element and shunt inductor, the source connected directly to ground and the drain connected to the source of a second field effect transistor. The gate of the second transistor is connected to ground via a capacitor. The drain of the second transistor is then connectable to the input of the FM receiver circuit 40. There is here also a load resistor connected between the drain of the second transistor and the feed voltage Vdd.

Here an FM transmitter circuit can furthermore be connected to the monopole element via a switch. This switch is necessary if the input impedance of the transmitter circuit is much lower, such as ten times lower than the input impedance $Z_{in}$ of the amplifier in front of the FM receiver circuit. However, this switch can be omitted if the input impedance of the transmitter circuit is in the same order as the input impedance $Z_{in}$ of the amplifier.

By providing a transmitter circuit connected to the monopole element, this monopole element can be shared and thus function for both transmission and reception. The transmitter circuit should preferably be connected to the monopole element approximately at the antenna connection point.

Figure 8:
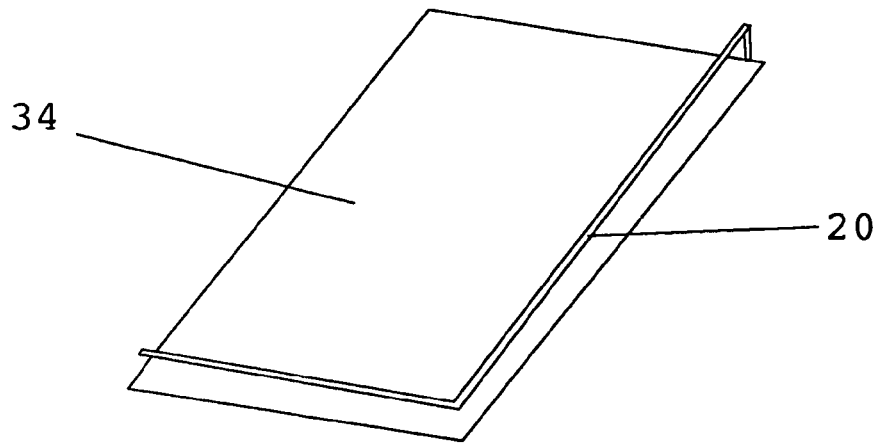
FIG. 8 is a schematic perspective view of a monopole element configuration in relation to a ground plane according to a second embodiment of the present invention.

It should here be realised that there are a number of further variations that can be made to the present invention. The second section of the monopole element may for instance, according to a second embodiment of the present invention, not be a straight section, but may include two straight parts, for instance two straight parts joined to each other at an angle of 90 degrees as is shown in FIG. 8. These two parts will however both run in the plane that is parallel with the ground plane. It is furthermore possible to provide the second section with a periodic shape, like a meandering shape or a sinus curve shape in said plane. Such a shape may provide a radiator inductance in series with the radiator capacitance and radiator resistance of the monopole element model, which radiator inductance may thus also be selected to influence the impedance matching, by suitable selection of the structure of the second section. The second end of the second section need furthermore not be free, but may be connected to ground using a capacitor. The capacitance of this capacitor together with the radiator capacitance then makes up the antenna capacitance. This capacitor therefore also helps in the matching to the amplifier stage. It is furthermore possible that the second section of the monopole element stretches out beyond the edge of the ground plane. In this case the radiator resistance in the monopole element model is influenced in that the resistance is proportional to the height above the ground plane plus the distance that the second section stretches out beyond the ground plane.

The antenna device was above being described as including the monopole element, the inductor and the amplifier stage. It is possible that the antenna device does not include the amplifier stage, in which case it would thus only include the monopole element and the inductor. It is furthermore possible that the antenna device only includes the monopole element. In these variations of the present invention, the elements that are not a part of the antenna device will however be required in the portable electronic device in which the antenna device is to be placed.

Preferred embodiments of an antenna device according to the invention have been described. However, the person skilled in the art realizes that these can be varied within the scope of the appended claims without departing from the inventive idea.

It is realized that the shape and size of the antenna device according to the invention can be varied within the scope defined by the appended claims. Thus, the exact antenna configurations can be varied so as to correspond to the shape of the portable electronic device, desired performance etc.

The above-described embodiments of an antenna device according to the invention have been described as antenna devices adapted for reception of radio signals in the FM frequency band. However, other applications are also possible, such as use for digital video broad-casting (DVB) signals in the frequency range of about 400-800 MHz.

A FET has been described as the preferred transistor type. It will be realized that other types of transistors, such as hetero-junction bipolar transistors (HBT), can be used as well.

It will be appreciated that the transmitter circuit can be implemented also in the first embodiment shown in FIGS. 3 and 5.

The monopole element may finally be provided in a holding unit, such as an antenna carrier or a middle deck holding the monopole element. This holding unit may then be of a plastic material, which is easily mounted in the interior of the portable electronic device in relation to the circuit board.

The invention claimed is:

1. An antenna device for receiving radio signals in at least one operating frequency band and for being provided in the interior of a portable electronic device, the antenna device comprising:

a monopole radiating and/or radiation receiving element including a feeding portion adapted to be connected to an antenna connection point;

wherein:

an inductor is connectable between the antenna connection point and ground; and an input of an amplifier stage is connectable to the antenna connection point;

the at least one operating frequency band includes the FM band;

the antenna device comprises an amplifier stage that includes a transistor that is a field effect transistor or a bipolar transistor and comprises a gate, a source, and a drain, said transistor having a minimum noise figure below 1 dB and a gain above 15 dB in the first operating frequency band;

the source of the transistor is connected directly to ground;

the gate of the transistor is connected to the inductor;

the drain of the transistor is connectable to the radio circuit; and a resistor is connected between the drain of the transistor and a feed voltage.

2. The antenna device according to claim 1, wherein the monopole element is an elongated element.

3. The antenna device according to claim 1, wherein the monopole element is co-designed with the amplifier stage and inductor.

4. The antenna device according to claim 1, wherein the monopole element comprises a first section, which at a first end provides the feeding portion and at a second opposite end is joined to a first end of a second section of the monopole element, the first section having an extension in a first dimension from the feeding portion, and the second section is arranged in a plane provided in a second and third dimension perpendicular to the first dimension.

5. The antenna device according to claim 4, wherein the feeding portion is adapted for being placed adjacent a ground plane of the portable electronic device, the extension of the first section in the first dimension is perpendicular to the ground plane, the plane the second section is provided in is parallel with the ground plane and the second section is at least partly aligned with the ground plane when the monopole element is placed adjacent said ground plane.

6. The antenna device according to claim 5, wherein more than half of the second section is aligned with the ground plane when the monopole element is placed adjacent said ground plane.

7. The antenna device according to claim 1, wherein the length of the second section and the extension of the first section in the first dimension are selected for providing an antenna capacitance, which antenna capacitance together with the inductance of the inductor is matched to the input impedance of the amplifier stage.

8. The antenna device according to claim 7, further comprising a capacitor for connection between a second end of the second section and ground, which capacitor also contributes to the antenna capacitance.

9. The antenna device according to claim 1, wherein the monopole element is adapted for being placed adjacent a ground plane of the portable electronic device.

10. The antenna device according to claim 1, wherein the wavelengths of the operating frequency band are ten times or more longer than the electrical length of the monopole element.

11. The antenna device according to claim 1, further comprising the antenna connection point and the inductor, the inductance of the inductor selected together with an antenna capacitance of the monopole element to match the input impedance of the amplifier stage.

12. The antenna device according to claim 11, further comprising the amplifier stage.

13. The antenna device according to claim 12, wherein the amplifier stage has an input impedance that is ten times or more higher than 50 ohms.

14. The antenna device according to claim 12, wherein the amplifier stage includes one or more gallium arsenide (GaAs) field-effect transistor (FET) transistors.

15. The antenna device according to claim 14, wherein said GaAS FET transistors include one or more GaAS pseudomorphic high electron mobility transistor (pHEMT) transistors.

16. A portable electronic device comprising:
a ground plane;
an antenna connection point;
a monopole radiating and/or radiation receiving element including a feeding portion connected to an antenna connection point;
an inductor connected between the antenna connection point and ground;
an amplifier stage with an input connected to the antenna connection point; and
a radio circuit connected to an output of the amplifier stage;
wherein the ground plane, antenna connection point, monopole element, inductor, amplifier stage, and radio circuit are within an interior of the portable electronic device to allow receiving of radio signals in at least one operating frequency band; and wherein:
the at least one operating frequency band includes the FM band;
the amplifier stage includes a transistor that is a field effect transistor or a bipolar transistor and comprises a gate, a source and a drain, said transistor having a minimum noise figure below 1 dB and a gain above 15 dB in the first operating frequency band;
the source of the transistor is connected directly to ground;
the gate of the transistor is connected to the inductor;
the drain of the transistor is connectable to the radio circuit; and
a resistor is connected between the drain of the transistor and a feed voltage.

17. The portable electronic device according to claim 16, wherein:
the inductance of the inductor has been selected together with an antenna capacitance of the monopole element to match the input impedance of the amplifier stage; and/or
the amplifier stage has an input impedance that is ten times or more higher than 50 ohms; and/or
the amplifier stage includes one or more GaAS FET transistors; and/or
the amplifier stage includes one or more GaAS pHEMT transistors.

18. The portable electronic device according to claim 16, wherein the ground plane extends over an area that is limited by a number of corners and said antenna connection point is provided adjacent one of these corners of the ground plane.

19. A portable electronic device comprising an antenna device within an interior of the portable electronic device, for receiving radio signals in at least one operating frequency band, the antenna device including:
a monopole radiating and/or radiation receiving element including a feeding portion adapted to be connected to an antenna connection point;
wherein:
an inductor is connectable between the antenna connection point and ground;
an input of an amplifier stage is connectable to the antenna connection point;
an output of the amplifier stage is connectable to a radio circuit; and
the wavelengths of the operating frequency band are ten times or more longer than the electrical length of the monopole element;
the at least one operating frequency band includes the FM band;
the amplifier stage includes a transistor that is a field effect transistor or a bipolar transistor and comprises a gate, a source and a drain, said transistor having a minimum noise figure below 1 dB and a gain above 15 dB in at least one operating frequency band;
the source of the transistor is connected directly to ground;
the gate of the transistor is connected to the inductor;
the drain of the transistor is connectable to the radio circuit; and
a resistor is connected between the drain of the transistor and a feed voltage.

20. The portable electronic device according to claim 19, wherein the portable electronic device further includes within its interior:
a ground plane;
an antenna connection point to which the antenna device is connected;
an inductor connected between the antenna connection point and ground;
an amplifier state with an input connected t the antenna connection point; and
a radio circuit connected to an output of the amplifier stage.

* * * * *